US005185616A

United States Patent [19]

Wilcke

[11] Patent Number: 5,185,616

[45] Date of Patent: Feb. 9, 1993

[54] DEVELOPER STATION FOR A LASER PRINTER

[75] Inventor: Gerhard Wilcke, Berlin, Fed. Rep. of Germany

[73] Assignee: berolina Schriftbild Wilcke, Wolff, Busch & Partner KG, Berlin, Fed. Rep. of Germany

[21] Appl. No.: 523,218

[22] Filed: May 14, 1990

[30] Foreign Application Priority Data

May 18, 1989 [DE] Fed. Rep. of Germany ....... 3916377

[51] Int. Cl.[5] ............................................ G01D 15/16

[52] U.S. Cl. .................................... 346/1.1; 346/108; 355/260

[58] Field of Search .................. 346/108, 107 R, 160, 346/1.1; 355/245, 260, 298

[56] References Cited

U.S. PATENT DOCUMENTS 4,816,877 3/1989 Keen ................................ 355/133
4,990,964 2/1991 Kraehm ............................ 355/260

*Primary Examiner*—Mark J. Reinhart
*Attorney, Agent, or Firm*—Mark P. Stone

[57] ABSTRACT

In order to reduce environmental damage by toner refill cartridges constructed as disposable articles, it is proposed, in a developer station which is provided by the manufacturer with a shaft (2) to receive toner refill cartridges, to use said shaft (2) as an additional tank closed off by a lid (3), it being possible to refill said tank via a refill opening (6).

16 Claims, 1 Drawing Sheet

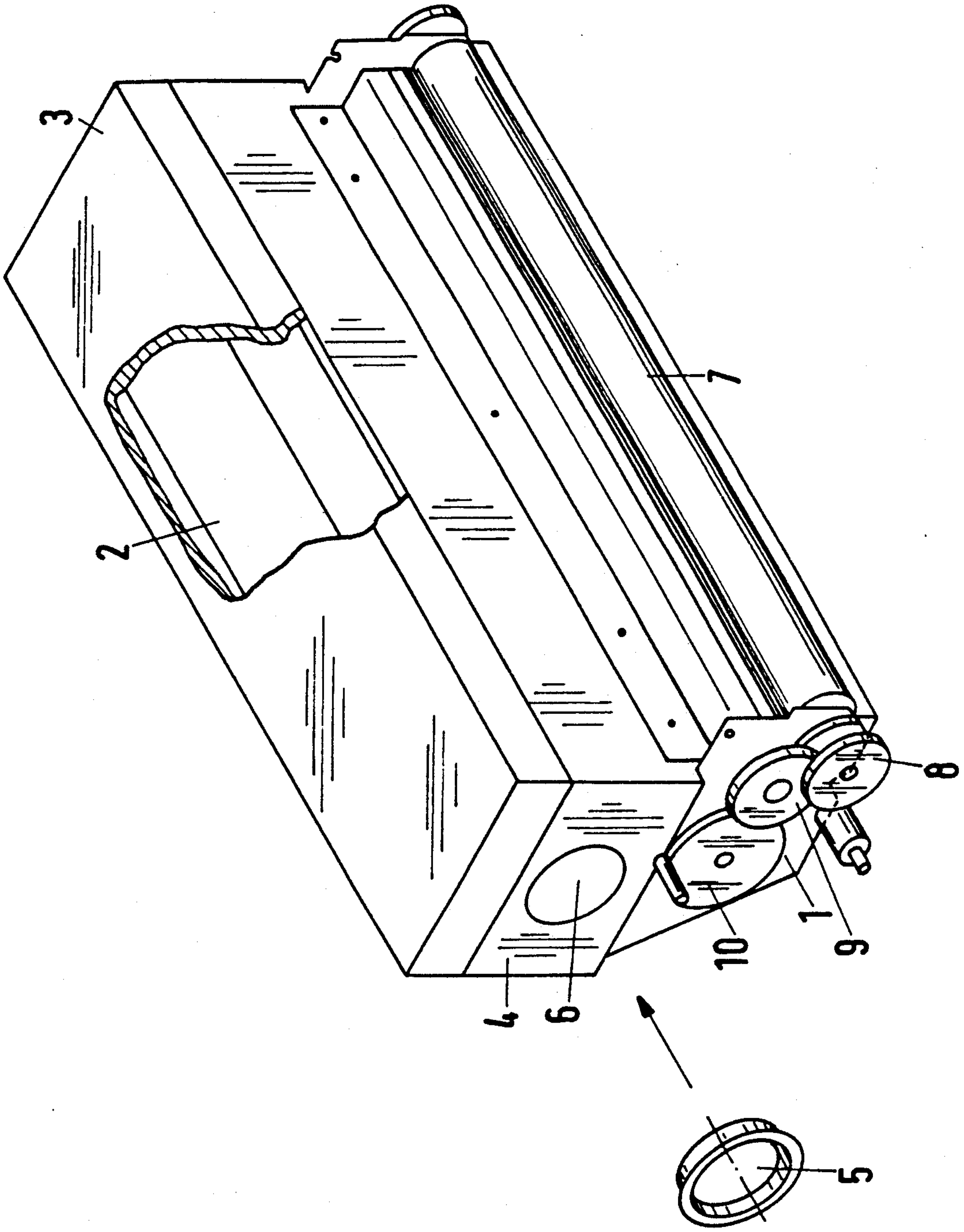
3
2
7
8
1
9
10
6
4
5

DEVELOPER STATION FOR A LASER PRINTER

BACKGROUND OF THE INVENTION

The invention relates to an exchangeable developer station for a laser printer having an elongate toner tank, a shaft arranged above the toner tank and a toner delivery roller mounted in front of the toner outlet opening of the toner tank.

In a known developer station of the abovementioned type, the shaft serves to receive a cartridge for refilling the toner tank. At the lower end of the shaft for the toner refill cartridge, a circumferential seal is arranged, against which one edge of the toner refill cartridge, which is closed off by a tear-off film on its underside, can rest in order to prevent toner from escaping not only during refilling but also during operation of the developer station, i.e. during operation of the developer station, the toner refill cartridge fulfils the function of a lid, which, in view of the fact that the volumes of toner container and toner cartridge have to be virtually the same, is certainly excessively bulky. Since an "old" toner refill cartridge must be exchanged for a "new" toner cartridge whenever the toner container is empty and the toner refill cartridges are constructed as disposable cartridges, not only is relatively frequent changing of toner refill cartridges required but also the latter damage the environment as refuse.

SUMMARY OF THE INVENTION

The invention is based on the object of providing a developer station of the type under consideration, in which on the other hand the number of refill intervals is reduced by at least one half and in which damage to the environment by toner refill cartridges is avoided. This object is achieved according to the invention in that the upper end of the shaft is permanently closed off by a lid and one of the end walls of the sealed shaft which increases the toner capacity of the station is provided with a toner refill opening which can be closed off.

The advantages of the developer station according to the invention are evident. Since the entire shaft volume can be used as an additional toner tank, the filling volume of said toner tank is considerably increased, i.e. in practice more than doubled. The doubling of the toner tank volume results in having the number of refill intervals. Expensive and bulky refill cartridges which damage the environment can be dispensed with, and refilling is then possible from large-scale containers. It may be cited against the above advantages that they have to be gained by a reduction of the ease of refilling; however, this argument would be without foundation because it starts from the mistaken assumption that the refilling has to be performed by the user himself. In a modern service industry-oriented society such an assumption would however prove to be erroneous, the user has the much more attractive option of handing over the entire developer station to a third party for refilling within the scope of an exchange program, and this has the additional advantage that the refilling personnel can at the same time carry out any maintenance work on the developer station which may be necessary, hence increasing the working life of said developer station to the effect of an additional reduction of damage to the environment.

BRIEF DESCRIPTION OF THE DRAWINGS

The invention is described below with reference to an exemplary embodiment illustrated in perspective in the enclosed drawing.

DESCRIPTION OF THE BEST MODE FOR CARRYING OUT THE INVENTION

In the drawing, 1 is the toner container of a developer station for a commercially available laser printer. Above the toner container 1, a rectangular shaft 2 is arranged, which in the known developer station is open and serves as a guide and receptacle for a toner refill cartridge, the filling volume of which essentially corresponds to the filling volume of the toner container 1. In the developer station illustrated in the drawing, the shaft 2 is permanently closed off at the top by a lid 3 of cup-shaped construction, to form a chamber, moreover its volume can be used, just like the lid contents, additionally to receive toner. In order to permit refilling with toner, an end wall 4 of the shaft 2 is provided with a toner refill opening 6 which can be closed off by a stopper 5. In order to connect the mutually facing edges of the shaft 2 and of the lid 3, all known and suitable joining processes, in particular adhesion or welding processes, can be used. As illustrated in drawing, the end wall 6 of the shaft 3 is aligned with a downwardly extending end wall of the lid 3.

The outlet opening of the toner container 1 is mounted in front of a delivery roller 7, a gear wheel 8 serving to drive said delivery roller and being connected, fixed in terms of rotation, to a further gear wheel which drives, via an intermediate wheel 9, a drive wheel 10 for an agitator shaft arranged inside the toner container 1.

I claim:

1. Exchangeable developer station for a laser printer for eliminating removable toner cartridges, said developer station including a toner tank having an outlet opening, a shaft of the type adapted to removably receive a toner cartridge mounted therein above said toner tank, and a toner delivery roller mounted in front of said outlet opening of said toner tank, said shaft having at least one upwardly extending end wall, said developer station further comprising a lid mounted above said shaft, said lid and said shaft defining a closed chamber precluding insertion of a toner cartridge therein, said lid having at least one downwardly extending end wall, said closed chamber having at least one end wall formed from said upwardly extending end wall of said shaft and said downwardly extending end wall of said lid, said end wall of said closed chamber having a toner refill opening defined therein through which toner refill is supplied within said closed chamber.

2. The developer station as claimed in claim 1 including means for selectively sealing said toner refill opening.

3. The developer station as claimed in claim 2 wherein said means for selectively sealing said toner refill opening is a stopper removably mounted over said toner refill opening.

4. The developer station as claimed in claim 1 wherein said toner refill opening is defined in said at least one end wall of said shaft.

5. The developer station as claimed in claim 1 wherein said lid is mounted to said shaft such that the volume of said chamber formed from said lid and said shaft is greater than the volume of said shaft.

6. The developer station as claimed in claim 5 wherein said volume of said chamber is at least twice as large as the volume of said shaft.

7. The developer station as claimed in claim 1 wherein said lid is of a cup-shaped construction.

8. The developer station as claimed in claim 1 wherein said lid is permanently mounted to said shaft.

9. The developer station as claimed in claim 1 wherein said end wall of said shaft and said end wall of said lid defining said end wall of said chamber are in alignment with each other.

10. A method of retrofitting a developer station for a laser printer of the type including a toner tank having an outlet opening, a shaft adapted to removably receive a toner cartridge therein mounted above said toner tank, and a toner delivery roller mounted in front of said outlet opening in said toner tank; said method adapted to eliminate use of removable toner cartridges and to increase the toner storage capacity of said developer tank; the steps of said method including:

mounting a lid on top of said shaft for precluding insertion of a toner cartridge therein by defining a closed chamber comprising said lid and said shaft, said closed chamber having at least one end wall formed from a downwardly extending end wall of said lid and a upwardly extending end wall of said shaft, and providing a toner refill opening in said chamber end wall through which toner refill is supplied within said closed chamber.

11. The method as claimed in claim 10 further including the step of providing said toner refill opening in a portion of said chamber end wall defined by said end wall of said shaft.

12. The method as claimed in claim 10 further including the step of permanently mounting said lid to said shaft.

13. The method as claimed in claim 10 further including the step of selectively opening and closing said toner refill opening by removably mounting a closure element over said toner refill opening.

14. Exchangeable developer station for a laser printer for eliminating removable toner cartridges, said developer station including an elongate toner tank having an outlet opening, a shaft of the type adapted to receive a removable toner refill cartridge therein, said shaft having at least one upwardly extending end wall, and a toner delivery roller mounted in front of said outlet opening of said toner tank, said developer station further comprising a lid permanently mounted to the top of said shaft to define a closed chamber comprising said shaft and said lid, said closed chamber precluding insertion of a toner cartridge therein, and a toner refill opening defined in said at least one upwardly extending end wall of said shaft for supplying toner refill within said closed chamber.

15. The developer station as claimed in claim 14 further including closure means removably mounted on said toner refill opening defined in said at least one end wall of said shaft.

16. The developer station as claimed in claim 14 wherein said lid includes at least one downwardly extending end wall, said closed chamber defining at least one chamber end wall comprising said at least one downwardly extending end wall of said lid and said at least one upwardly extending end wall of said shaft, said lid being mounted over said shaft such that said end walls of said shaft and said lid are in alignment with each other.

* * * * *